Patented Feb. 24, 1942

2,273,966

UNITED STATES PATENT OFFICE 2,273,966

PROCESS FOR PREPARING 1-AMINO-5-NITRO-ANTHRAQUINONE

David X. Klein, Silverside Heights, Del., assignor to E. I. du Pont de Nemours & Company, Wilmington, Del., a corporation of Delaware No Drawing. Application October 26, 1939, Serial No. 301,438

2 Claims. (Cl. 260—378)

This invention relates to an improved process for the preparation of 1-amino-5-nitroanthraquinone.

1-amino-5-nitroanthraquinone is a dye intermediate which has been known for a number of years and according to the literature it may be prepared by the amination of 1-chloro-5-nitroanthraquinone or by the selective reduction of 1,5 - dinitroanthraquinone. 1-chloro-5-nitroanthraquinone is a relatively expensive intermediate to prepare in satisfactory purity. It is often the case that the cost and therefore the actual value of a finished dyestuff from a commercial standpoint is dependent in a large extent upon the cost of the intermediates employed, and the development of a class of colors, which may exhibit very desirable properties, may be held up for years because a commercially practical process for preparing an intermediate has not been developed. Attempts to prepare 1-amino-5-nitroanthraquinone by selective reduction of one nitro group have not been successful from a commercial point of view. Reducing agents such as the alkali metal bisulfites, and the use of ammonia under pressure, both give very impure products that can be purified only with difficulty and while the reduction with dimethyl aniline as disclosed in German Patent 147,851 in the presence of a catalyst as more particularly mentioned in Enzyklopädie der Technischen Chemie by Ullmann, 1928, vol. 1, page 493 (sulfuric acid being employed as the catalyst) gives a product that can be used for certain purposes, the process is impractical from a commercial standpoint because it cannot be controlled. The reaction of the dimethyl aniline with the dinitro-anthraquinone is highly exothermic and except when only very small amounts are reacted, even on a laboratory scale where one can obtain very efficient cooling, can the reaction be stopped at the mononitro stage.

It is the object of this invention to provide a process for selectively reducing 1,5-dinitro-anthraquinone to the corresponding 1-amino-5-nitroanthraquinone which will give a product of high purity in high yields and which can be readily controlled even when operated on a large plant scale.

I have found that 1,5-dinitro-anthraquinone can be reduced with dimethyl aniline to the corresponding 1 - nitro - 5-amino-anthraquinone when the reaction is carried out in the presence of phenol or a similar solvent and in the presence of an acid catalyst, and that the reaction takes place smoothly and without the use of external cooling when the dimethyl aniline is added slowly to the reaction mass at reaction temperature. The reduction is carried out until a microscopic examination of the reaction mass shows that all of the dinitro-anthraquinone has been reacted. The mass is then cooled and diluted and the resulting 1-amino-5-nitroanthraquinone is isolated. When working with a relatively pure 1,5-dinitro-anthraquinone a 1-amino-5-nitroanthraquinone of relatively high purity is directly obtained.

The following examples are given to illustrate the invention. The parts used are by weight:

Example 1

600 parts of molten phenol and 23 parts of 93% sulfuric acid are heated to 165–170° C. and 150 parts of 1,5-dinitroanthraquinone are added under agitation. 150 parts of dimethyl aniline are added over a period of approximately 30 minutes under agitation. The reaction which takes place is highly exothermic and with care in adding the dimethyl aniline the temperature of the mixture is maintained at 165–170° C. The mass is agitated until a microscopic examination indicates that no 1,5-dinitroanthraquinone remains unreacted. This requires approximately 10 to 15 minutes after all of the dimethyl aniline has been added. The mass is then quickly cooled to 90° C. and 200 parts of 95% alcohol are added. The mass is then allowed to cool under agitation for 10 hours. It is filtered at room temperature and the filter cake is washed with 200 parts 95% alcohol and then with hot water until all traces of phenol are removed. The filter cake is dried at approximately 100° C., yielding a semi-crystalline product having a melting point of 283° C. The alcohol and phenol may be recovered by distillation and used again in subsequent reactions.

The amount of phenol employed may be varied within wide limits. The reaction has been successfully carried out in 1200 parts of phenol with the proportion of the reactants as otherwise given in the above example. The amount of alcohol employed in the isolation of the product may likewise be increased. Where 1200 parts of phenol are employed approximately 500 parts of alcohol has been found to give the same results as obtained in the above example.

The temperature at which the reaction may be carried out may be varied within reasonable limits. The time required for carrying out the reaction will of course vary with the temperature employed. Where the reaction is carried out at 155° C. and the dimethyl aniline is added over a period of 20 minutes and the reaction mass was agitated at 155° for 90 minutes, similar results are obtained to those obtained in the above example.

For complete reduction of the 1-nitro group at least one part of dimethyl aniline should be employed per part of 1,5-dinitroanthraquinone. The degree of reduction is controlled by a microscopic examination of the reaction mass as the reaction proceeds. When the yellow crystals of the dinitroanthraquinone are no longer visible when a sample of the reaction mass is examined under the microscope the reduction of the dinitroanthraquinone to the 1-amino-5-nitroanthraquinone is complete. Other phenolic solvents such as the cresols and higher homologues of phenol may be used in place of phenol. The solvent employed should be a solvent for the reactants and one from which the aminonitroanthraquinone can be isolated.

I claim:

1. The process for preparing 1-amino-5-nitroanthraquinone which comprises reacting 1,5-dinitroanthraquinone with dimethyl aniline in a phenolic solvent and in the presence of sulfuric acid, the dimethyl aniline being added slowly to prevent an undue liberation of heat, the reduction being stopped immediately upon disappearance of the 1,5-dinitroanthraquinone from the suspension.

2. The process for preparing 1-amino-5-nitroanthraquinone which comprises reacting 1,5-dinitroanthraquinone with dimethyl aniline in phenol, and in the presence of sulfuric acid, the dimethyl aniline being added slowly to prevent an undue liberation of heat, the reduction being stopped immediately upon disappearance of the 1,5-dinitroanthraquinone from the suspension.

DAVID X. KLEIN.